July 17, 1956 — A. TALALAY ET AL — 2,755,215
METHOD OF MAKING REINFORCED FIBROUS POROUS CUSHIONING MATERIAL
Original Filed Nov. 17, 1949 — 2 Sheets-Sheet 1
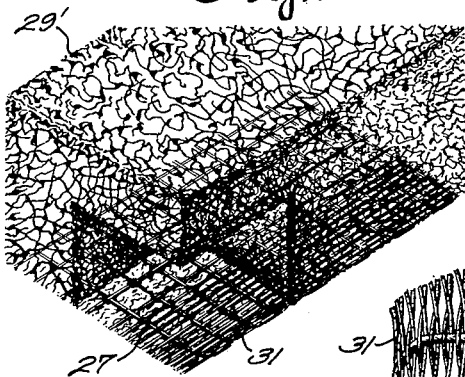
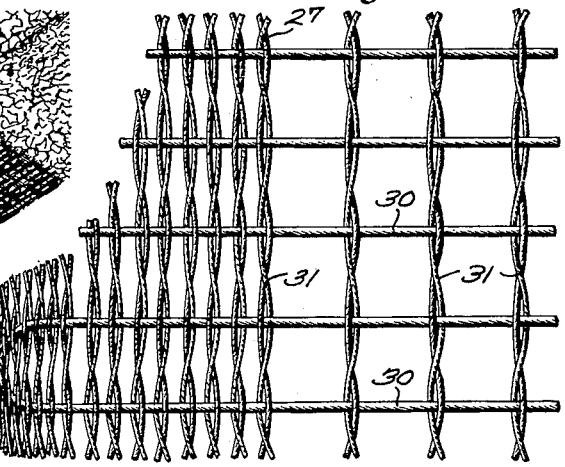
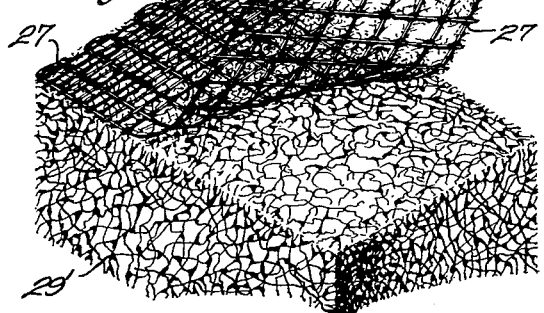
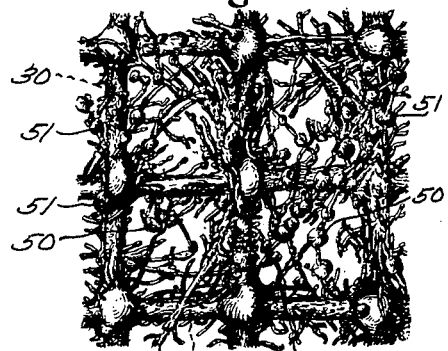
INVENTORS
Anselm Talalay
Alfred P. Barton
BY
ATTORNEY July 17, 1956
A. TALALAY ET AL
2,755,215
METHOD OF MAKING REINFORCED FIBROUS POROUS CUSHIONING MATERIAL
Original Filed Nov. 17, 1949
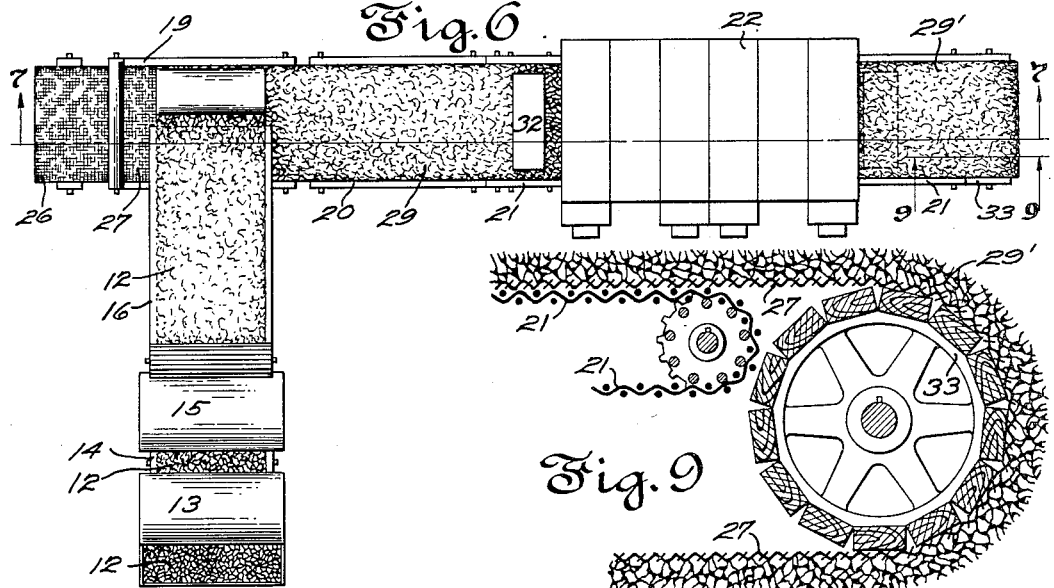
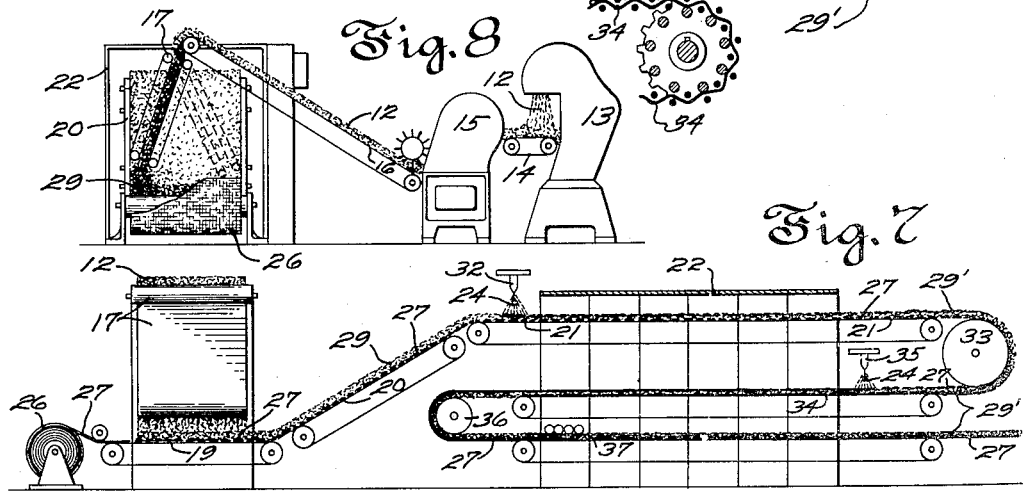
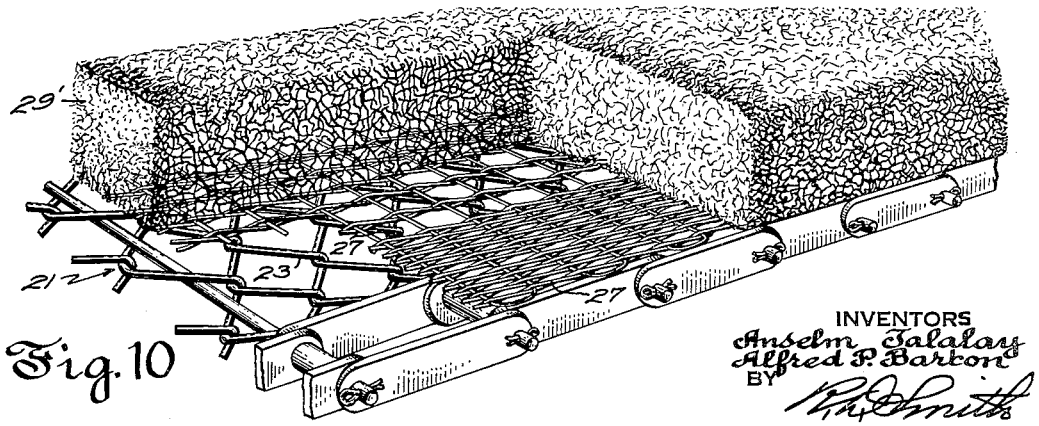
INVENTORS
Anselm Talalay
Alfred P. Barton
BY
ATTORNEY

United States Patent Office 2,755,215
Patented July 17, 1956

2,755,215

METHOD OF MAKING REINFORCED FIBROUS POROUS CUSHIONING MATERIAL

Anselm Talalay, New Haven, Conn., and Alfred P. Barton, Lincoln, Nebr., assignors, by mesne assignments, to The B. F. Goodrich Company, Akron, Ohio, a corporation of New York Original application November 17, 1949, Serial No. 127,982, now Patent No. 2,580,202, dated December 25, 1951. Divided and this application November 23, 1951, Serial No. 257,878

1 Claim. (Cl. 154—101)

This invention relates to the art of making openly porous fibrous resilient materials, particularly of the type comprising a spot bonded network of upholstery fibers suitable for use as cushioning bodies in upholstered furniture or related articles such as mattresses, as distinguished from loose fibrous stuffing materials requiring to be confined within a flexible jacket in order to effect containment of the fibers in performing a cushioning function.

This application is divisional from our copending application, Serial No. 127,982, filed November 17, 1949, now Patent No. 2,580,202, wherein is claimed the product resulting from methods and processes herein claimed.

Reference may be had to U. S. Patent No. 1,906,028 granted April 25, 1933, for disclosure of a resilient upholstery material comprising curly intermingled loosely clinging long resilient upholstery fibers more appropriately termed filaments such as horse hair, pig's hair, or cattle hair, spot bonded together by a vulcanized flexible adhesive at only their extra-planar points of mutual crossing or close proximity, such coating of adhesive only thinly covering the surfaces of the individual fibers. Such adhesive, which may be latex, is sprayed so sparsely into and through the interstices of the material before vulcanization that it does not fill nor to any appreciable extent clog the same. Upholstery material of this kind is commonly called rubberized hair, one trade name for same being "Hairlock." The adhesive coating is commonly applied in liquid form and then set by heat. In the case of latex it is vulcanized by heat.

Materials heretofore proposed to be combined with rubberized hair as a reinforcing stratum or otherwise have blocked its facial porosity and its self ventilating or respiratory properties which make it durable and cool to bodily contact. Former attempts at reinforcing rubberized hair have objectionably altered the uniformity of its resilient resistance to compression in one or more directions. Nevertheless successful reenforcement is greatly needed for overcoming the tendency of unreinforced rubberized hair to "bottom out" or mushroom sidewise at or near the support surface against which it rests when the material is squeezed against such support by localized pressure, and to guard against surface disintegration or break down of the material at the points of bonding together of its component fibers. Also multiple plies or blocks of material of unreinforced rubberized hair are difficult to secure together dependably in broadside surface contact or in edgewise contact by the use of conventional clips, staples, stitches or other mechanical fastening means because lacking tear strength and having little or no coherence other than that afforded by the weak spot bonds formed by the adhesive coating between individual hairs. Also such material is not sufficiently tough in the absence of jacketed confinement to stand pulling and hauling in sheet form when it is thrown about in piling, or packing it at the place of manufacture. Neither does it stand handling well in the necessary processes of fabricating it into combination with conventional structure of upholstered furniture for use as a cushioning pad, as in covering the top ends of a bed work of upholstery springs or the like which will wear and gouge it in use.

It is an object of this invention to make rubberized hair materials such as "Hairlock" more useful as well as more versatile and more durable for handling and fabricating into finished articles.

Other objects are to reenforce a thick sheet of rubberized hair on at least one of its broadside surfaces by means of a facing that will greatly increase its tear strength and inhibit its stretching without in any way impairing the desirable porosity of its open stereoreticulate mesh or its resilient flexibility and compressibility or seriously increasing its cost in comparison with ordinary rubberized hair.

A further objective is to attach permanently to a thick sheeting of rubberized hair by the same latex spraying operation that bonds together its component hairs, a reinforcing medium which during the spraying process is capable, unaided, of supporting and conveying an unlimited continuous length of the loose dry hair fibers in the form of a thick traveling bat.

A particular object of these improvements is to produce a cushion or pad of rubberized hair for covering the ends of a bedwork of upholstery spring coils, which pad shall be of such integral toughness and tearproof strength that it does not become fragmented or upbraided by direct contact with the wires of the upholstery springs even though the burlap usually employed as a protective interlay or covering for the spring ends is omitted. Elimination of such burlap spring covering avoids a source of much labor and expense heretofore encountered in the building of upholstered furniture.

The foregoing and other objectives of the invention will appear in greater particular from the following description of a successful embodiment of the invention having reference to the accompanying drawings wherein:

Fig. 1 is a perspective view of a fairly thick swatch of rubberized hair showing partially pulled away from its top surface a facing that has been bonded thereto in accordance with this invention.

Fig. 2 is a perspective view looking at the reverse or bare side of the same swatch of rubberized hair showing a portion of its corner cut away to expose the underlying facing that has been bonded thereto.

Fig. 3 is an enlarged plan view showing the open-mesh woven structure of a textile herein termed "cottonet."

Fig. 4 is a greatly enlarged sectional view of a top portion of the switch of Fig. 1.

Fig. 5 is a plan view drawn on a less enlarged scale showing the reinforced surface of the material.

Fig. 6 is a plan view of apparatus suitable for making in continuous unlimited length a single ply of rubberized hair reenforced in accordance with the invention.

Fig. 7 is a partly diagrammatical view taken in section on the plane 7—7 in Fig. 6, looking in the direction of the arrows.

Fig. 8 is a view looking toward the left end of the apparatus in Fig. 6.

Fig. 9 is an enlarged fragmentary view taken on the plane 9—9 in Fig. 6 looking in the direction of the arrows.

Fig. 10 is an enlarged fragmentary perspective view of the bat of filaments riding on a coarse mesh net to which the bat becomes bonded while borne by the net.

In Figs. 6 to 10, suitable apparatus is pictured in part diagrammatically for practicing methods incorporating the invention. Most of such apparatus is familiar to textile workers. There is a feeding hopper 13 supplied with preferably curled animal hair or with comparable dry and loose coarse upholstery fibers or filaments which may be of vegetable or mineral derivation, and which delivers such fibers continually in automatically determined amounts onto an endless conveyer belt 14 which carries them into the garnett machine 15. Here the fibers are carded and finally doffed in the form of a loosely coherent bat 12 onto an uphill endless conveyer belt 16 which leads to the top end of the oscillating camel-back lapper 17. The downwardly extending double conveyer of lapper 17 swings automatically back and forth across the path of advance of a continually traveling endless conveyer belt 19 which precedes in series two neighboring endless conveyer belts 20 and 21, the latter of which passes through the heat zone of a vulcanizing and drying oven 22.

As an illustrative way to provide in one form an open stratum of strands to serve as a porous facing in the finished product, there is fed from a roll 26 of preferably coarse mesh textile netting 27, known to some trades as "cottonet," a continuous length of said netting having a width about equal to that of the conveyer belts 19, 20 and 21. In some instances the weft strands 30 might be eliminated from netting 27 leaving merely a stratum of laterally spaced apart warp strands 31 or vice versa. Continuous netting 27 rides on these conveyer belts serially and travels in unison with the top stretches thereof while a crosslapped progressive depositing of the bat 12 of bare filaments from the lapper 18 onto netting 27 continually takes place while the latter is being conveyed atop conveyer belt 19. The bat 12 of bare filaments is deposited at a proper rate to build up a continuous thicker dry bat 29 of uniform weight density, say between one and two inches thick, consisting of an entanglement of bare and preferably curly hair or upholstery filaments loosely clinging together in dry, fluffy, intermingled condition so as to form extraplanar intercommunicating interstices throughout the bat between the fibers thereof. In this condition the dry bat 29 is borne by the netting 27 and is thus continually carried upward on the inclined conveyer belt 20 and then transferred to the horizontal conveyer belt 21 somewhat in advance of the entrance of belt 21 into oven 22.

With the traveling dry bat of fibers 29 borne by and carried in unison with the netting 27, all of these parts progress in unison toward the right in Figs. 6 and 7 and before entering oven 22 advance to a wetting station where is located a downwardly directed spray nozzle 32. While netting 27 is preferably strong enough to serve as the sole traveling support for bat 29, both bat and netting are herein illustrated as resting on and traveling in unison with the porous mechanical conveyer belts 19, 20 and 21.

In practice, the spraying station which includes nozzle 32 may have a plurality of like stationary spray nozzles distributed crosswise the path of conveyer travel, or one or more spray nozzles such as 32 may be mechanically arranged to traverse the traveling bat automatically and constantly while projecting a jet 24 of heat settable liquid agglutinant or adhesive such as latex or some other dispersion of an elastomer or bonding substance having substantially the resilient deformability of soft rubber downward so as first to encounter the bat 29 and then penetrate the same far enough to reach the netting 27 or any other open stratum of strands that may be employed in the place thereof. Such bonding liquid is kept from accumulating and matting or gumming up the bottom interstices of the bat or the meshes of the net because of the openness of the meshes of both the net 27 and of the flexible crosswire construction 23 of metallic conveyer belt 21. In whatever form the stratum of strands such as 31 may assume, the openings between the strands in such stratum should be at least as spacious as the smallest of the interstices between the fibers of the sprayed bat in order not to clog the otherwise porous face of the bat of fibers and impair its ability to pass respiratory air freely therethrough. A stratum of strands for the purpose of this invention should be separated by coplanar openings sufficiently spacious to prevent individual strands from hampering the flexibility of their neighboring strands so that the entire stratum of strands shall offer substantially no greater resistance to flexure and crumpling than do the individual strands of the stratum. Thus said stratum of strands effectively reenforces the tear and stretch resistant strength of the said network of fibers without adding appreciable resistance to compression thereof in any direction.

The sparsity of the deposit of liquid latex 24' or other bonding material delivered by the jet or jets 24 is such that it fails to fill or clog the voids or interstices in the open structure of bat 29. It merely coats all surfaces of the individual filaments or hairs 12 and strands 30, 31 thinly but sufficiently to cause tiny globules or fillets 50 of the sprayed liquid to collect at the coplanar crossing spots of the mutually contacting or closely adjacent filaments throughout the bat. Vulcanization of the liquid coating in oven 22 causes a permanent flexible and stretchable spot bonding 50 at these coplanar crossing points of the individual filaments and at the same time causes a dependable permanent bond 51 of the same spot confined nature between the coated strands of netting 27 and only those coated fibers of the bat which lie close to or in contact with such strands. Thus, this latter bonding takes place at spots where individual fibers 12 touch or nearly touch the spaced apart stout woven weft or warp strands 30, 31 of the net 27 and may, therefore, also be referred to as spot bonding in a sense that distinguishes from a more solid or clogging type of bonding that would result if a continuous layer of the liquid adhesive were caused to build up in the interstices of the sprayed bat at the level of surface contact between the bat and some nonporous fabric facing therefor through inability of excess liquid adhesive to pass or drain through such nonporous fabric. The fact that the openings between strands in netting 27 are at least as large as the smallest of interstices in the sprayed bat enables all excess spray of latex to pass through the netting and drain out of the bat. This is equally true if the bat and/or netting in the region of surface contact therebetween are dipped or immersed in the liquid agglutinant in place of or in addition to spraying it, such being in the art a well known equivalent step or process for applying thin coatings of liquid agglutinant to filamentary bats and open mesh fabrics. These same wide openings between the strands permit some of the fibers 29 to project therethrough and curl over against the outer faces of the strands which can be encouraged by any well-known needling process permitted by the openness of conveyor belt 21. This strengthens the cling of the netting to the bat of fibers.

When the thus sprayed and dried or possibly partially vulcanized netting and bat leave the right end of oven 22 in Figs. 6 and 7, they cohere tenaciously and form to all intents and purposes an integral structure capable of traveling without disruption around the idler pulley 33 as shown in Fig. 9. They are then immediately received onto a second horizontal conveyer belt 34 spaced below belt 21 and traveling in the opposite direction through oven 22 at the same linear speed.

On belt 34, however, the combined bat and netting have become turned upside down so the netting is now on top. In this condition the traveling material is subjected to another downward spraying of latex or vulcanizable bonding liquid by the nozzle or nozzles 35 at a second wetting station which causes the direction of the spraying to be opposite to that of the first spraying with respect to the bat and netting so that this time the spray jet 24 first encounters the netting and easily passes therethrough before it enters the bat of previously bonded filaments 29'. The second coating of bonding liquid does not fill nor clog any interstices of the already rubberized hair or its reenforcing net but does increase the strength of bonding of the net to the bat. Mechanical belt 34 is porous at least to the extent of netting 27 as also is belt 21.

After this second spraying operation, the material again passes through oven 22 then around a second idler pulley 36 and back through the oven a third time on the conveyer belt 37 which may be porous like belts 21 and 34 permitting a continued application of heat to more thoroughly vulcanize and dry the product so that it becomes conditioned to be ready for use as it continually passes out of the oven and off from the conveyer belt 37.

The various driving and idler pulleys which support the belt conveyers hereinbefore referred to are not individually mentioned herein but are shown diagrammatically in the drawings. Their construction may be conventional and is well understood to workers in the art.

After the continuous length of finished product finally leaves the vulcanizing oven it is severed by suitable shears into desired sizes of sheet, slab, or block-like shapes for whatever particular purpose the material is to be used. Figs. 1 to 5, inclusive, illustrate in enlarged detail the nature of the finished product. Fig. 3 shows details of a preferred distribution of the widely spaced apart weft threads 30 which may suitably be of stout cotton and which cross the widely spaced apart pairs of warp threads 31 of the same size and material. They are arranged more closely together near the lengthwise border of the textile than elsewhere and are amassed very closely together at the edge of same to form a strong selvage enabling the net to be more resistive to skewing in this border portion of its weave as well as stronger and more stable as a carrier for the bat as well as adding considerable tear strength to the border of the product shown in Fig. 2. In fact, net 27 is thereby constructed so strongly that it alone may serve as conveyer for the bat 29 and 29' without depending on underlying mechanical conveyer belts such as 19, 20, 21, 34, 37, etc. Strength of this degree is highly desirable in handling vulcanized product as for instance where the weight of a sheet of the completed web material as large, say, as a mattress subjects the edge of the sheet to severe tearing strain when the sheets are picked up and piled or thrown about in factory processes.

When it is desired to combine the thicknesses of several sheets of the material shown in Fig. 2, one ply may be placed upon another in the manner of laminae with an adhesive first applied therebetween and the composite layers can then be vulcanized to produce a permanent all-over surface bonding from which results an integral cushioning body of any desired thickness and proportions. In a material so constituted there will be a layer of the netting against both faces of each layer of rubberized hair. This serves greatly to reenforce the finished body as a whole. If it is desired to fasten together single layers of the product by sewing or stapling them face to face or edge to edge, the close woven selvage of the textile net will take the strain of all pulling that might otherwise tear the layers apart. As shown in Fig. 2 cutting away the rubberized hair from the net can leave exposed a bare area of the net which may be overlapped by the rubberized hair of an edgewise adjoining sheet, slab or block so that a continuous extent of the stout net overlaps the adjacent borders of edgewise adjoining sheets of the rubberized hair thus forming a very tough bond therebetween when the overlapping rubberized hair is bonded to the overlapping border of the bared net by merely a vulcanized adhesive.

We claim:

The method of firmly bonding a bat of loosely entangled long curly filaments to spaced apart textile strands in a manner to confine said strands to a stratum thereof abutting a face of said web while maintaining unclogged the voids and spaces between said filaments and between said strands, which includes the steps of, laying dry textile strands of individually continuous length in laterally spaced apart lines on a perforate traveling conveyor in such relation as to confine said strands to a relatively thin stratum and to leave vacant spaces between said strands in said stratum, assembling into a relatively thick cohesive dry bat long curly filaments in intermingled loosely clinging together relation so as to leave spacious voids therebetween in said bat, playing off said bat onto said stratum of spaced apart strands into face to face abutment with said stratum simultaneously with advance of said stratum of strands lengthwise of said strands in unison with said bat and said conveyor below and past a spraying jet, projecting a spray of heat setttable liquid agglutinant from said jet so that said bat receives said spray on the way of said spray from said jet to said strands first through said voids and then onward through said spaces with such force and sparsity as to deposit a coating of said agglutinant on merely the surfaces of the individual filaments and strands thin enough to leave said voids and spaces unclogged with said agglutinant while depositing a sufficient quantity of said agglutinant to join the coatings of the filaments and the coatings of the strands with small fillets at points of mutual contiguity, said conveyor being sufficiently perforate to give free passage therethrough to the fall of the sprayed agglutinant thereby to avoid retention of same in clogging relation to said voids and spaces, subjecting the sprayed filaments and strands to a zone of heat sufficient to set said agglutinant while said bat of filaments remains in face to face abutment with said stratum of strands thereby to spot bond said filaments permanently together and to spot bond filaments at the surface of said bat permanently to said strands without clogging said voids and spaces, spraying additional vulcanizable liquid adhesive in an opposite direction with respect to said bat and stratum of strands so as first to encounter and in part pass through said spaces in said stratum of strands and then enter and penetrate said voids between the said filaments of the said bat, and subjecting said oppositely sprayed bat and stratum of strands to vulcanizing heat.

References Cited in the file of this patent

UNITED STATES PATENTS

| | | |
|---|---|---|
| 2,152,901 | Manning | Apr. 4, 1939 |
| 2,341,130 | Unsworth | Feb. 8, 1944 |
| 2,455,534 | Talalay | Dec. 7, 1948 |
| 2,502,361 | Zeigler | Mar. 28, 1950 |

FOREIGN PATENTS

| | | |
|---|---|---|
| 450,689 | Great Britain | July 23, 1936 |
| 122,653 | Australia | Nov. 14, 1946 |